United States Patent [19]

Ona et al.

[11] Patent Number: 4,459,382

[45] Date of Patent: Jul. 10, 1984

[54] FIBER-TREATING COMPOSITIONS COMPRISING EPOXYFUNCTIONAL SILICONES AND AMINOFUNCTIONAL SILICONE COPOLYMERS OR CARBOXYFUNCTIONAL SILICONE COPOLYMERS

[75] Inventors: Isao Ona; Masaru Ozaki; Yoichiro Taki, all of Chiba, Japan

[73] Assignee: Toray Silicone Company, Ltd., Tokyo, Japan

[21] Appl. No.: 404,209

[22] Filed: Aug. 2, 1982

[30] Foreign Application Priority Data

Aug. 6, 1981 [JP] Japan ................. 56-123535

[51] Int. Cl.³ ............................................. C08L 83/04
[52] U.S. Cl. ................................ 524/860; 106/287.1; 106/287.11; 528/33; 524/588
[58] Field of Search .................... 106/287.11, 287.1; 528/33; 524/588, 860

[56] References Cited

U.S. PATENT DOCUMENTS

| 3,876,459 | 4/1975 | Burrill | 8/127.6 |
| 4,062,999 | 12/1977 | Konda et al. | 428/391 |
| 4,311,626 | 1/1982 | Ona et al. | 528/33 |
| 4,311,737 | 1/1982 | Ishizaka et al. | 528/33 |
| 4,359,545 | 11/1982 | Ona et al. | 524/262 |
| 4,366,001 | 12/1982 | Ona et al. | 106/287.11 |

FOREIGN PATENT DOCUMENTS

| 1118163 | 2/1982 | Canada . |
| 48-17514 | 5/1973 | Japan . |
| 53-19715 | 6/1978 | Japan . |
| 53-19716 | 6/1978 | Japan . |
| 53-98499 | 8/1978 | Japan . |
| 53-36079 | 9/1978 | Japan . |
| 1598845 | 9/1981 | United Kingdom . |

Primary Examiner—Melvyn I. Marquis
Attorney, Agent, or Firm—George A. Grindahl; Andrew H. Ward

[57] ABSTRACT

Fiber-treating compositions are disclosed which comprise polydiorganosiloxanes bearing epoxy-substituted groups and polydiorganosiloxane bearing amino-substituted groups and polyalkyleneoxide groups, or carboxy-substituted groups and polyalkyleneoxide groups. These compositions confer upon fibers enhanced antistatic properties, water absorbency, stain resistance, softness, smoothness, crease resistance and compression recovery. Advantageously, these enhanced properties are retained upon repeated washing of fibers treated with the compositions of the present invention.

6 Claims, No Drawings

FIBER-TREATING COMPOSITIONS COMPRISING EPOXYFUNCTIONAL SILICONES AND AMINOFUNCTIONAL SILICONE COPOLYMERS OR CARBOXYFUNCTIONAL SILICONE COPOLYMERS

BACKGROUND OF THE INVENTION

The present invention relates to compositions for treating fibers. More specifically, the present invention relates to compositions for conferring upon fibers treated therewith enhanced antistatic properties, water absorbency, stain resistance, softness, smoothness, crease resistance, and compression recovery.

Fiber-treating organosiloxane compositions are known. For example, polydimethylsiloxane fluids, and emulsions thereof, have been used to confer softness upon fibers. Polymethylhydrogensiloxane, $\alpha, \omega$ dihydroxy polydimethylsiloxane, and condensation catalysts have been used in combination to confer long-lasting softness, crease resistance, and compression recovery to fibers. Polymethylhydrogensiloxanes, and polydiorganosiloxanes containing vinyl groups in combination are also known as fiber-treating compositions. Unfortunately, treatment compositions comprising polydimethylsiloxane furnish inadequate crease resistance and compression recovery, and treatment compositions comprising polymethylhydrogensiloxanes require a catalyst, suffer from short bath life, and can pose a fire and explosion hazard, due to generation of hydrogen gas.

Japanese Patent Sho 48(1973)17514 discloses a fiber-treating composition comprising a polydiorganosiloxane containing at least two ethoxy radicals per molecule and a polydiorganosiloxane containing aminoalkyl radicals. Japanese Patent Sho 53(1978)36079 discloses a fiber-treating composition consisting of $\alpha, \omega$-dihydroxypolydimethylsiloxane and an organosilane containing aminoalkyl radicals and alkoxy radicals. Japanese Patents Sho 53(1978)19715 and 53(1978)19716 disclose fiber-treating compositions consisting of aminoalkyltrialkoxysilanes and polydiorganosiloxanes containing epoxyalkyl radicals. Japanese Patent Sho 53(1978)98499 discloses fiber-treating compositions consisting of $\alpha, \omega$-bis(triorganosiloxy)polydiorganosiloxanes containing two or more aminoalkyl radicals. However, organosiloxanes containing alkoxy radicals have an adverse affect on treatment bath stability when used in an emulsion formulation; fibers treated with alkoxysilanes tend to be stiffened; and fabrics treated with polydiorganosiloxanes containing aminoalkyl radicals and epoxyalkyl radicals have a number of drawbacks, such as a tendency to pick up and retain electrostatic charges generated by friction, a tendency to have lowered resistance to staining by oily substances, and lowered water absorbency. To alleviate these drawbacks, it is common practice to additionally treat fibers with hydrophilic surfactants, such as sulfuric acid ester salts of ricinoleic acid, Turkey red oil, polysiloxane-polyalkyleneoxide copolymers, or the addition products of polyalkyleneoxides with alcohols. Unfortunately, these hydrophilic surfactants dissolve in the water used in laundering, and in the solvents used in drycleaning. Thus, the beneficial effects of hydrophilic surfactants are lost upon laundering or drycleaning.

As a result of intensive investigation by the present inventors, the disadvantages of prior fiber-treating compositions have been overcome. The present invention provides fiber-treating compositions which confer upon fibers treated therewith enhanced antistatic properties, water absorbency, resistance to stains, softness, smoothness, crease resistance, and compression recovery.

BRIEF SUMMARY OF THE INVENTION

It is an object of the present invention to provide polydiorganosiloxane compositions for treating fibers. It is a further object to provide compositions for treating fibers that confer upon fibers treated therewith enhanced antistatic properties. It is a further object to provide compositions that confer upon fibers treated therewith enhanced resistance to stains. It is another object to provide compositions that confer upon fibers treated therewith enhanced softness. It is a further object to provide compositions that confer upon fibers treated therewith enhanced water absorbency, enhanced smoothness, enhanced crease resistance, and enhanced compression recovery. It is a still further object of the present invention that said enhanced properties be substantially retained after laundering or drycleaning.

These, and other objects which will be apparent to those skilled in the fiber-treating art upon consideration of the present specification and claims, are realized by the compositions of the present invention, which comprise a liquid carrier, a first polydiorganosiloxane, (A), containing at least two epoxy-containing organic radicals, and a second polydiorganosiloxane selected from the group consisting of: (B) polydiorganosiloxanes containing at least two amino-containing hydrocarbon radicals and at least one polyalkyleneoxide radical; and, (C), polydiorganosiloxanes containing at least two carboxy-containing hydrocarbon radicals and at least one polyalkylenoxide radical.

DETAILED DESCRIPTION OF THE INVENTION

The present invention relates to fiber-treating compositions comprising a liquid carrier and two polydiorganosiloxanes, said polydiorganosiloxanes consisting essentially of a first polydiorganosiloxane, (A), having the formula $A(R_2SiO)_x(RESiO)_ySiR_2A$, wherein R is a substituted or unsubstituted monovalent hydrocarbon radical, E is a monovalent organic radical containing at least one epoxy group, A is a radical selected from the group consisting of R and E radicals, x has a value of from 0 to 2000, y has a value of from 0 to 200, the sum of the values of x and y is from 1 to 2000, with the proviso that each (A) molecule contain at least two epoxy groups, and a second polydiorganosiloxane selected from the group consisting of (B), a polydiorganosiloxane having the formula

wherein a has a value of from 0 to 10, R is a substituted or unsubstituted hydrocarbon radical, $R^1$ is a divalent hydrocarbon radical, $R^2$ is a radical selected from the group consisting of the hydrogen atom and monovalent hydrocarbon radicals, G is a radical having the formula $(R^5)_bO(C_2H_4O)_c(C_3H_6O)_dR^6$, wherein $R^5$ is a divalent organic radical, $R^6$ is a radical selected from the group consisting of the hydrogen atom, monovalent hydrocarbon radicals, acyl radicals, and monoester carbonate radicals, b has a value of 0 or 1, c has a value of from 0 to 50, d has a value of from 0 to 50, and the sum of the values of c and d is from 1 to 100, B is a radical selected from the group consisting of R radicals, $R^1(NHCH_2CH_2)_aNHR^2$ radicals, and G radicals, p has a value of from 0 to 1000, q has a value of from 0 to 100, r has a value of from 0 to 100, the sum of the values of p, q, and r is from 2 to 1000, with the proviso that each polydiorganosiloxane (B) molecule contain at least two $R'(NHCH_2CH_2)_aNHR^2$ radicals and at least one G radical, and, (C), a polydiorganosiloxane having the formula

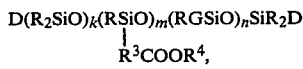

wherein R is a substituted or unsubstituted monovalent hydrocarbon radical, $R^3$ is a divalent hydrocarbon radical, $R^4$ is selected from the group consisting of the hydrogen atom and monovalent hydrocarbon radicals, G is a radical having the formula $(R^5)_bO(C_2H_4O)_c(C_3H_6O)_dR^6$, wherein $R^5$ is a divalent organic radical, $R^6$ is a radical selected from the group consisting of the hydrogen atom, monovalent hydrocarbon radicals, acyl radicals, and monoester carbonate radicals, b has a value of 0 or 1, c has a value of from 0 to 50, d has a value of from 0 to 50, and the sum of the values of c and d is from 1 to 100, D is a radical selected from the group consisting of R radicals, $R^3COOR^4$ radicals, and G radicals, k has a value of from 0 to 1000, m has a value of from 0 to 100, n has a value of from 0 to 100, the sum of the values of k, m, and n is from 2 to 1000, with the proviso that each (C) molecule contain at least two $R^3COOR^4$ radicals and at least one G radical.

Polydiorganosiloxane (A) of the compositions of the present invention, has the formula $A(R_2SiO)_x(RESiO)_ySiR_2A$. R in said formula is a substituted or unsubstituted monovalent hydrocarbon radical. Examples of unsubstituted monovalent hydrocarbon radicals include alkyl radicals, such as methyl, ethyl propyl, butyl, isobutyl, nonyl, and dodecyl radicals; alkenyl radicals, such as vinyl and allyl radicals; aryl radicals, such as phenyl and napthyl radicals; and aralkyl radicals, such as phenylethyl and phenylmethyl radicals. Substituted monovalent hydrocarbon radicals include unsubstituted monovalent hydrocarbon radicals as hereinabove described having one or more hydrogen atoms substituted with such substituents as halogen atoms such as fluorine, chlorine, or bromine atoms. While it is not necessary that all the R groups selected be identical, most R radicals are preferably methyl radicals.

E in the above formula for polydiorganosiloxane (A) is a monovalent organic group containing at least one epoxy group. E has the general formula;

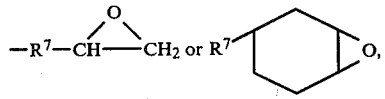

wherein $R^7$ is a divalent substituted or unsubstituted organic radical, such as methylene, ethylene, propylene, phenylene, chloroethylene, fluoroethylene, $-CH_2OCH_2CH_2CH_2-$, $-CH_2CH_2OCH_2CH_2-$, -continued
$-CH_2OCH_2CH_2OCH_2CH_2-$, $-CH_2CH_2OCHCH_2-$,
                                              |
                                              $CH_3$ and other divalent substituted or unsubstituted organic radicals.

Radical A in the formula for polydiorganosiloxane (A) is a radical selected from the group consisting of R radicals as hereinabove described, and E radicals as hereinabove described. In the above formula x has a value of from 0 to 2000; y has a value of from 0 to 200; and the sum of the values of x and y is from 1 to 2000. More preferably, x has a value of from about 10 to about 1000. Each polydiorganosiloxane (A) molecule contains at least two epoxy groups.

One suitable method for the synthesis of polydiorganosiloxane (A) of the composition of the present invention is the addition reaction disclosed in U.S. Pat. No. 2,823,218 which is hereby incorporated herein by reference.

Polydiorganosiloxane (B) of the compositions of the present invention has the formula

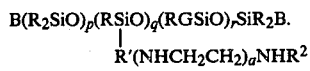

R in said formula is a substituted or unsubstituted hydrocarbon radical as hereinabove described for polydiorganosiloxane (A).

G in the formula for polydiorganosiloxane (B) of the compositions of the present invention is a polyalkyleneoxide radical having the formula $(R^5)_bO(C_2H_4O)_c(C_3H_6O)_dR^6$, wherein $R^5$ is a divalent organic radical selected from the group consisting of alkylene radicals containing 1 to 5 carbon atoms, and radicals in which the $-C_6H_4-$ radical, $-CO-$ radical, or $-NHCO-$ radical is bonded to an alkylene radical, said alkylene radical being bonded in turn to a silicon atom of the $(RGSiO)_r$ segment of the formula of polydiorganosiloxane (B). $R^6$ is a hydrogen atoms; substituted or unsubstituted monovalent hydrocarbon radicals as hereinabove described; acyl radical, such as the acetyl radical, propionyl radical, and benzoyl radical; or monoester carbonate radical. In the above formula for (B) b has a value of 0 or 1; c has a value of from 0 to 50; d has a value of from 0 to 50; and the sum of the values of c and d is from 10 to 100. More preferably, the sum of the values of c and d is from 5 to 50. Each polydiorganosiloxane (B) molecule contains at least two amino groups, and at least one G radical.

$R^1$ of the $-R^1(NHCH_2CH_2)_aNHR^2$ segment of the formula for polydiorganosiloxane (B) of the compositions of the present invention, is a divalent hydrocarbon radical, such as an alkylene radical such as methylene, ethylene, or propylene; an arylene radical such as phenylene; or a alkylene-arylene radical such as $-CH_2CH_2C_6H_4-$. $R^2$ is a hydrogen atom or monovalent hydrocarbon radical as hereinabove described. The value of a in said $-R^1(NHCH_2CH_2)_aNHR^2$ segment is of from 0 to 10.

B in the formula for polydiorganosiloxane (B) is an R radical, G radical, or $R^1(NHCH_2CH_2)NHR^2$ radical, each of these radicals being as hereinabove described. The value of p in said formula is of from 0 to 1000; q has a value of from 0 to 100; r has a value of from 0 to 100; and the sum of the values of p, q, and r is from 2 to 1000.

More preferably, p has a value of from 10 to 500, q has a value of from 2 to 40, r has a value of from 1 to 30, and the sum of the values of p, q, and r is from 10 to 500.

A convenient method to synthesize polydiorganosiloxane (B) of the compositions of the present invention is the addition reaction disclosed in U.S. Pat. No. 4,247,592, which is hereby incorporated herein by reference.

Polydiorganosiloxane (C) of the compositions of the present invention has the formula

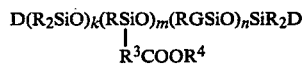

wherein R is a substituted or unsubstituted monovalent hydrocarbon radical as hereinabove described. $R^3$ in the $-R^3COOR^4$ segment of the formula for polydiorganosiloxane (C) is a divalent hydrocarbon radical as hereinabove described, and $R^4$ in said segment is a hydrogen atom, a substituted monovalent hydrocarbon radical, or an unsubstituted monovalent hydrocarbon radical. G in the formula for polydiorganosiloxane (C) is a polyalkyleneoxide radical as hereinabove described for polydiorganosiloxane (B).

D in the formula for polydiorganosiloxane (C) is an R radical, G radical, or $R^3COOR^4$ radical. In the above formula for (C) k has a value of from 0 to 1000, m has a value of from 0 to 100, n has a value of from 0 to 100, and the sum of the values of k, m, and n is from 2 to 100. Each polydiorganosiloxane (C) molecule contains at least two $R^3COOR^4$ radicals and at least one G radical. An appropriate method of synthesis for polydiorganosiloxane (C) is the addition reaction disclosed in U.S. Pat. No. 2,823,218.

When polydiorganosiloxanes (A) and (B) are used conjointly to form compositions of the present invention, it is desirable that the epoxy groups in polydiorganosiloxane (A) and the amino groups in polydiorganosiloxane (B) be present in approximately, i.e. within about 10%, equimolar quantities.

When polydiorganosiloxanes (A) and (C) are used conjointly to form compositions of the present invention, it is desirable that the epoxy groups in polydiorganosiloxane (A) and the carboxy groups in polydiorganosiloxane (C) be present in approximately equimolar quantities. When polydiorganosiloxanes (A) and (C) are used conjointly, it is advantageous to incorporate an effective amount of a suitable catalyst to reduce the time and/or temperature required to crosslink the composition of the present invention. Exemplary of suitable catalysts are mildly basic substances, such as amines, such as triethylamine; or such as basic salts, such as sodium carbonate or lithium napthenate.

In order to apply the polydiorganosiloxanes of the compositions of the present invention to a fiber, a dispersion of one or both polydiorganosiloxanes in a liquid carrier is made.

The liquid carrier can be an organic solvent, in which case the dispersion is a solution, or the liquid carrier can be water, in which case the dispersion is an emulsion.

Examples of suitable organic solvents for use as the liquid carrier in the compositions of the present invention are aromatic hydrocarbon solvents, such as toluene and xylene; aliphatic hydrocarbon solvents, such as hexane, heptane, and octane; ketone solvents, such as acetone, methylethylketone and methylisobutylketone; ether solvents, such as ethyl acetate or butyl acetate; halogenated solvents, such as perchloroethylene and chlorothene; commercial solvents comprising a complex mixture of chemical species, such as petroleum distillate and turpentine; and other known solvents for polydiorganosiloxanes. A solution of one or both polydiorganosiloxanes in a suitable solvent is made by simply mixing the solvent and polydiorganosiloxane or polydiorganosiloxanes together.

If the liquid carrier used in forming a composition of the present invention is water, the polydiorganosiloxane or polydiorganosiloxanes must be emulsified. The polydiorganosiloxane or polydiorganosiloxanes can be emulsified per se, with suitable high shear mixing means, such as a colloid mill. Emulsification of the polydiorganosiloxane or polydiorganosiloxanes in water can be facilitated and the stability of the resulting emulsion can be increased, by the incorporation of a suitable amount of one or more emulsifying agents. Examples of suitable emulsifying agents include sulfuric acid esters of higher alcohols, alkylbenzene sulfonic acid salts, the addition products of higher aliphatic acid sorbitan esters, and other emulsifying agents.

The dispersion can comprise both polydiorganosiloxanes to be used in treating a fiber, or two separate dispersions can be made, one dispersion for each of the polydiorganosiloxane components. If separate dispersions are made for each polydiorganosiloxane, said separate dispersions can be mixed before application to the fiber, or they can be applied individually to said fiber. Any method resulting in the simultaneous presence of polydiorganosiloxane (A) and polydiorganosiloxane (B) or (C) upon the fiber can be used, and is within the scope of this invention. Generally, a single dispersion of both polydiorganosiloxanes is applied to the fiber.

The dispersion can be applied to the fiber by a variety of known methods, such as spraying, rolling, and immersion.

The amount of polydiorganosiloxane deposited upon the fiber by the application step is not narrowly critical, and commonly ranges from about 0.1% to 4%, by weight, based on the weight of the fiber.

After the dispersion has been applied to the fiber, it is desirable to substantially remove the liquid carrier. Removal of said liquid carrier can be accomplished by exposing said fiber to elevated temperatures and/or decreased pressure for a period of time sufficient to substantially vaporize said liquid carrier. Alternatively, said fiber can be held at ambient temperature and pressure for a period of time sufficient to substantially vaporize said liquid carrier. Preferably, said fiber is heated to an elevated temperature at ambient pressure. Said elevated temperature should be below the temperature known to degrade the fiber itself.

While not strictly necessary, an additional heating step is desirable to effectively crosslink the two polydiorganosiloxanes of the composition of the present invention on the fiber. A period of time from 1 minute to 6 hours, and a temperature from about 100° C. to about 200° C. is typical of heating conditions that can be employed to effectively crosslink the two polydiorganosiloxanes of the compositions of the present invention on the fiber. Of course, the heating step and solvent removal step can be advantageously combined when solvent removal is effected by exposure to elevated temperature.

Additives well known to the fiber-treating art can be incorporated in the compositions of the present invention, or said additives can be deposited upon the fiber in a separate step. Examples of such additives are antistatic agents, softeners, crease-resistance agents, fire retardants, perfumes and the like.

The compositions of the present invention can be applied to natural fibers, regenerated fibers, and synthetic fibers. Examples of natural fibers include wool, silk, flax, cotton, and asbestos; examples of regenerated fibers include rayon and acetate; examples of synthetic fibers include fibers fabricated from polyamides, polyesters, polyacrylonitrile, polyolefins, glass, carbon, silicon carbide and other known fiber-forming materials.

Said natural, regenerated, or synthetic fibers can be in the form of staple, filament, tow, yarn, woven fabric, knitted fabric, non-woven fabric, resin-treated cloth, synthetic leather, bedding cotton, and the like. Preferably, said fibers are treated continuously in the form of fabric.

Individually, polydiorganosiloxane (A), polydiorganosiloxane (B), or polydiorganosiloxane (C), can each confer upon fabrics treated therewith antistatic properties, water absorbency, stain resistance, softness, smoothness, crease resistance, and compression recovery, but said properties rapidly deteriorate upon laundering or drycleaning. Polydiorganosiloxanes (A) and (B) conjointly, or polydiorganosiloxanes (A) and (C) conjointly, confer upon fibers treated therewith retention of said properties with less deterioration of said properties upon laundering or drycleaning.

The following examples and comparisons are included to further illustrate the use of the compositions of the present invention. These examples are not to be construed as limiting the scope of the present invention. All parts and percentages herein are by weight unless otherwise indicated. Viscosities reported herein were measured in centistokes at a temperature of 25° C. and converted to $m^2$/second by multiplying by $1.00 \times 10^{-6}$ $m^2$/second/centistoke and rounding the result of said multiplication to two significant figures.

Test Methods

The following test methods were used herein to evaluate fabrics composed of fibers treated with compositions of the present invention, and to evaluate fabrics treated with comparison compositions.

Simulated Drycleaning and Laundering

Repeated drycleaning and laundering were simulated herein by immersing a cloth sample to be evaluated in perchloroethylene, stirring the perchloroethylene and cloth together for 15 minutes, subsequently removing the cloth and allowing it to dry at ambient temperature and pressure. The above procedure was followed twice for each cloth sample evaluated. Each cloth sample was then laundered twice, on the heavyduty cycle of an automatic washing machine, for 15 minutes, in a 0.5% solution of Marcel ® soap in water. Each cloth sample was then aged for 1 week at a temperature of 20° C. and relative humidity of 60%.

Antistatic Properties

Antistatic properties were measured herein by determining frictionally generated electrostatic charge in volts (V). Said charge was generated by the Kyoto University Chemistry Laboratory static test apparatus, by rotating each cloth sample being evaluated at a rate of 13.33 Hz (800 revolutions per minute), for one minute.

Residual Polydiorganosiloxane

Polydiorganosiloxane remaining on treated cloth was determined herein by X-ray fluorescence, using an X-ray fluorimeter manufactured by Rigaku Denki Kogyo K.K.. The amount of polydiorganosiloxane was determined before and after simulated drycleaning and laundering and the value obtained after simulated drycleaning and laundering was calculated as a percentage of the value obtained before simulated drycleaning and laundering.

Stain Resistance

Stain resistance was evaluated herein by exposing the cloth to be tested to an artificial staining composition consisting of a thorough mixture of:
300 g ASTM No. 1 oil
3 g coal tar
5 g dried clay powder
5 g portland cement
5 g sodium dodecylbenzenesulfonate Each cloth tested was immersed in the above staining composition for 30 minutes at a temperature of 60° C. After 30 minutes of immersion, the stained cloth was removed, lightly rinsed, dried, and then laundered for 10 minutes on the heavy duty cycle of an automatic washing machine in a 0.5% solution of Marcel soap in water. Said stained and laundered cloth was then dried, and the reflectivity of light at a wavelength of 550 nm was determined. Results were expressed as a percentage of the reflectivity obtained on the same cloth before immersion in the staining composition. Permanent staining results in a loss of reflectivity.

Feel — The feel of a cloth was evaluated herein by an experienced observer manipulating the cloth to be evaluated and recording his impression of the softness and flexibility of said cloth.

EXAMPLE 1

A fiber-treating composition of the present invention was prepared by mixing together:
99 parts of toluene;
(A) 0.5 parts of a polydiorganosiloxane having the formula

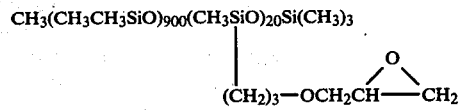

and having a viscosity of $1.8 \times 10^{-2} m^2$/second;
(B) 0.5 parts of a polydiorganosiloxane having the formula

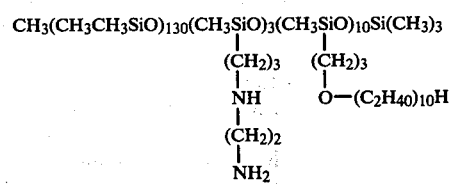

and having a viscosity of $4.0 \times 10^{-3} m^2$/second.

A sample of white cloth composed of 65% polyester fibers and 35% cotton fibers was immersed in the above-prepared fiber-treating composition, removed from said composition, and squeezed with a mangle roll, until approximately 1% of polydiorganosiloxane, based on the weight of the cloth, remained on said cloth. The cloth was then allowed to dry at ambient temperature and pressure. After drying, the cloth was heated to a temperature of 170° C. for a period of time of 10 minutes. Evaluation results for this treated cloth are displayed in Table 1.

For comparison, the procedure of Example 1 was repeated for each of the polydiorganosiloxanes of Example 1 individually. That is, a first cloth was treated with 1.0 parts of polydiorganosiloxane (A) in 99 parts of toluene, dried, squeezed, and heated by the procedure of Example 1, and a second cloth was treated with 1.0 parts of polydiorganosiloxane (B) in 99 parts of toluene, dried, squeezed, and heated by the procedure of Example 1. Evaluation results for these comparisons are displayed in Table 1.

TABLE 1

| | Example 1 | Un-treated cloth | Comparisons | |
|---|---|---|---|---|
| | | | Poly-diorgano-siloxane (A) | Poly-diorgano-siloxane (B) |
| antistatic properties (electrostatic charge) V | | | | |
| before simulated drycleaning and laundering | 910 | 1660 | 1980 | 870 |
| after simulated drycleaning and laundering | 1120 | 1610 | 1770 | 1280 |
| Residual Polydiorganosiloxane % after simulated drycleaning and laundering | 45 | — | 25 | 37 |
| Stain Resistance % of original reflectivity | 67 | 55 | 44 | 59 |

It is clear from consideration of the data displayed in Table 1 that the composition of the present invention, Example 1, had a higher amount of polydiorganosiloxane remaining after simulated drycleaning and laundering them the comparisons, retained antistatic properties better than the comparisons on untreated cloth, and demonstrated superior stain resistance.

EXAMPLE 2

A fiber-treating composition of the present invention was prepared by mixing together:
0.1 parts triethylamine;
98.4 part perchloroethylene;
(A) 0.5 parts of polydiorganosiloxane (A) of Example 1;
(C) 1.0 parts of a polydiorganosiloxane having the formula

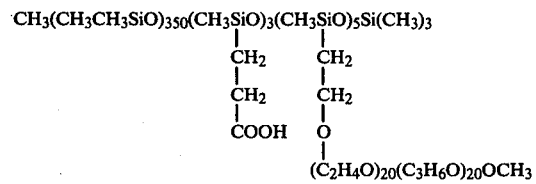

and having a viscosity of $8.5 \times 10^{-3} m^2$/second.

Knitted underwear consisting of 65% polyester fibers and 35% flax fibers was immersed in the above fiber-treating composition, and centrifuged such that 1.5% polydiorganosiloxane, based upon the weight of said underwear, remained upon said underwear. The underwear was then held at ambient temperature and pressure for 24 hours to substantially vaporize the perchloroethylene, after which step the underwear was heated at a temperature of 160° C. for a period of time of 5 hours.

Comparisons were generated by treating, by the procedure outlined in Example 2, underwear consisting of identical composition with 1.5 parts of polydiorganosiloxane (A) from Example 1, 0.1 parts of triethylamine, and 98.4 parts of perchloroethylene in a first comparison, and 1.5 parts of polydiorganosiloxane (1) from Example 2, 0.1 parts of triethylamine, and 98.4 parts of perchloroethylene in a second comparison.

Evaluation results for the underwear treated in Example 2, and for the underwear treated with the comparison compositions are displayed in Table 2.

TABLE 2

| | Example 2 | Untreated underwear | Comparisons | |
|---|---|---|---|---|
| | | | Polydiorgano-siloxane (A) plus triethylamine | Polydiorgano-siloxane (B) plus triethylamine |
| Residual polydiorganosiloxane % after simulated drycleaning and laundering | 37 | — | 20 | 10 |
| Stain Resistance % of original reflectivity | 66 | 48 | 43 | 54 |
| Feel after simulated drycleaning and launder- | softness and flexiblility both extremely good | softness and flexibility both very poor | softness and flexibility fairly good | softness good, flexibility rather poor | ing

The evaluation results displayed in Table 2 show that the underwear treated with the composition of the present invention has superior stain resistance and feel.

That which is claimed is:

1. Fiber-treating compositions comprising a liquid carrier and two polydiorganosiloxanes, said polydiorganosiloxanes consisting essentially of a first polydiorganosiloxane, (A), having the formula $$A(R_2SiO)_x(RESiO)_ySiR_2A,$$

wherein

R is a substituted or unsubstituted monovalent hydrocarbon radical,

E is a monovalent organic radical containing at least one epoxy group,

A is a radical selected from the group consisting of R and E radicals, x has a value of from 0 to 2000, y has a value of from 0 to 200, the sum of the values of x and y is from 1 to 2000, with the proviso that each (A) molecule contain at least two epoxy groups, and a second polydiorganosiloxane selected from the group consisting of (B), a polydiorganosiloxane having the formula $$B(R_2SiO)_p(RSiO)_q(RGSiO)_rSiR_2B$$
$$\quad\quad\quad\quad\quad|$$
$$\quad\quad\quad R^1(NHCH_2CH_2)_aNHR^2$$

wherein a has a value of from 0 to 10,

R is a substituted or unsubstituted monovalent hydrocarbon radical, $R^1$ is a divalent hydrocarbon radical, $R^2$ is a radical selected from the group consisting of the hydrogen atom and monovalent hydrocarbon radicals, G is a radical having the formula $(R^5)_bO(C_2H_4O)_c(C_3H_6O)_dR^6$ wherein $R^5$ is a divalent organic radical, $R^6$ is a radical selected from the group consisting of the hydrogen atom, monovalent hydrocarbon radicals, acyl radicals, and monoester carbonate radicals, b has a value of 0 or 1, c has a value of from 0 to 50, d has a value of from 0 to 50, and the sum of the values of c and d is from 1 to 100, B is a radical selected from the group consisting of R radicals, $R^1(NHCH_2CH_2)_aNHR^2$ radicals, and G radicals, p has a value of from 0 to 1000, q has a value of from 0 to 100, r has a value of from 0 to 100, the sum of the values of p, q, and r is from 2 to 1000, with the proviso that each polydiorganosiloxane (B) molecule contain at least two $R^1(NHCH_2CH_2)_aNHR^2$ radicals and at least one G radical, and, (C) a polydiorganosiloxane having the formula $$D(R_2SiO)_k(RSiO)_m(RGSiO)_nSiR_2D.$$
$$\quad\quad\quad\quad\quad|$$
$$\quad\quad\quad\quad R^3COOR^4$$

wherein

R is a substituted or unsubstituted monovalent hydrocarbon radical, $R^3$ is a divalent hydrocarbon radical, $R^4$ is selected from the group consisting of the hydrogen atom and monovalent hydrocarbon radicals, G is a radical having the formula $(R^5)_bO(C_2H_4O)_c(C_3H_6O)_dR^6$, wherein $R^5$ is a divalent organic radical, $R^6$ is a radical selected from the group consisting of the hydrogen atom, monovalent hydrocarbon radicals, acyl radicals, and monoester carbonate radicals, b has a value of 0 or 1, c has a value of from 0 to 50, d has a value of from 0 to 50, and the sum of the values of c and d is from 1 to 100, D is a radical selected from the group consisting of R radicals, $R^3COOR^4$ radicals, and G radicals, k has a value of from 0 to 1000, m has a value of from 0 to 100, n has a value of from 0 to 100, the sum of values of k, m, and n is from 2 to 1000, with the proviso that each (C) molecule contain least two $R^3COOR^4$ radicals and at least one G radical.

2. Fiber-treating compositions of claim 1 comprising polydiorganosiloxane (B).

3. Fiber-treating compositions of claim 1 comprising polydiorganosiloxane (C).

4. Fiber-treating composition of claim 3 further comprising an amount of amine catalyst sufficient to reduce the time and/or temperature necessary to crosslink said composition.

5. Fiber-treating composition of claim 4 wherein the amine catalyst is triethylamine.

6. Fiber-treating compositions of claim 1,2,3,4 or 5 wherein the liquid carrier is toluene.

* * * * *